June 29, 1937.                P. S. ROLLER                2,085,044
                    PROCESS OF TREATING PORTLAND CEMENT
                            Filed May 21, 1935
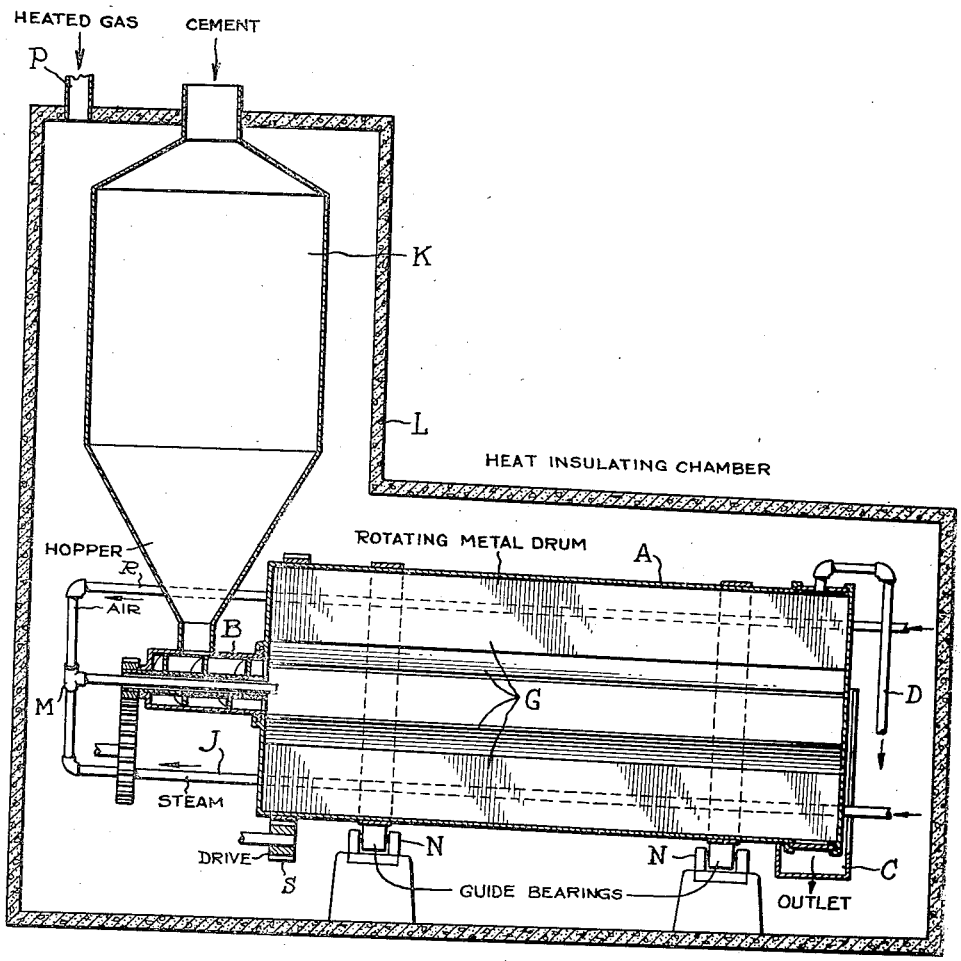
INVENTOR
Paul S. Roller
BY
ATTORNEY Patented June 29, 1937

2,085,044

UNITED STATES PATENT OFFICE 2,085,044

PROCESS OF TREATING PORTLAND CEMENT

Paul S. Roller, Stelton, N. J.

Application May 21, 1935, Serial No. 22,500

6 Claims. (Cl. 106—25)

The present invention relates to improved Portland cement and it particularly relates to processes and apparatus of producing such improved product.

Portland cement is usually made by mixing calcareous and clay substances respectively containing calcium carbonate and aluminum silicate, which mixture is ground, burned in a kiln and then again ground to form a powdered product which is the commodity of commerce.

The Portland cement so produced is primarily a mixture of compounds of calcium oxide, aluminum oxide, silicon oxide, and iron oxide, and an average type may contain 63 to 66% of calcium oxide, 20 to 22% of silica, 5 to 9% of alumina, 3 to 5% of iron oxide, 2 to 4% of magnesia and 0.5 to 1.5% of alkalies ($K_2O$ and $Na_2O$).

The chemical compounds making up the Portland cement are approximately as follows:

$(CaO)_3 \cdot SiO_2$—20% to 70%;
$(CaO)_2 \cdot SiO_2$—10% to 60%;
$(CaO)_3 \cdot Al_2O_3$—3% to 15%;
$(CaO)_4 \cdot Al_2O_3 \cdot Fe_2O_3$—3% to 15%.

From a commercial point of view it is desirable to produce Portland cements which are slow setting, for example, having an initial setting time of not less than 45 minutes when measured with the Vicat needle and which will retain such slow setting characteristics over long periods of time, although stored and shipped under different atmospheric conditions and to different countries with widely varying climates, and in an attempt to produce such characteristics, small amounts of gypsum or calcium sulphate have been added to the Portland cement.

However, the inclusion of calcium sulphate is undesirable due to the fact it forms a double compound which tends to cause expansion and disintegration of the cement and the specifications for Portland cement require that there be less than 2% of $SO_3$ in the final, which means that not more than 3.5% of gypsum may be added. However, even with this limited amount of gypsum, disadvantages may be encountered, particularly in regard to the tendency toward expansion and disintegration of the cement. Moreover, the cement is generally not of its highest stability and tends to lose its slow setting characteristics when stored.

In addition, Portland cement of the character above described when produced often contains free lime, which is necessarily hydrated upon mixing of the cement with water when it is utilized, and this free lime not only causes expansion of the cement but to a limited degree also causes an undesirable heating and requires additional water.

Moreover, to obtain a proper mixture, it is often necessary to add such large amounts of water as will prevent the obtaining of the most efficient cement-water mixture of the most desirable plasticity for industrial or commercial utilization and as will result in cement materials of decreased strength, and the present processes of producing cement do not give a Portland cement of as high a degree of uniformity and stability in these various respects above mentioned as is desired.

Among the objects of the present invention are to provide an improved Portland cement which will be of high uniformity, which will be slow setting even though the addition of calcium sulphate or gypsum be omitted or only very minute quantities thereof be added, which will be relatively stable although shipped and stored over long periods of time under varying climatic conditions, which will be devoid of excess tendency toward expansion or disintegration, which will require a minimum of water for a suitable mix of optimum plasticity and which will be substantially devoid of free lime requiring hydration at the time of preparing the water-mix.

Another object is to provide an installation for producing an improved Portland cement of high stability and uniformity of the character above described, which installation may be had without expensive or extensive alteration of cement-making installations commercially employed and which may be readily operated by the workmen in charge of cement plants without re-training.

Another object is to provide a process for making improved Portland cement of the character above described which will lend itself most satisfactorily to accurate and predetermined control with the production of a uniform product without the need of special skilled labor and with large scale production with the ordinary unskilled labor now available.

Other objects will be obvious and/or will appear during the course of the following specification.

In accomplishing the above objects it has been found that a Portland cement may be most satisfactorily improved, rendered relatively most stable and uniform and given enhanced slow setting properties by controlled proper exposure of such Portland cement after kilning to water vapor or steam.

When the Portland cement, after kilning, is effectively subjected to a moisture-containing atmosphere at a temperature which is less than 30 to 40° C. above its dew point, while the Portland cement is maintained at about the same temperature as the moisture-containing atmosphere, the Portland cement will absorb a relatively small amount of water vapor preferably less than 5%. The cement is preferably ground to the desired degree of fineness and is still hot when exposed to the steam.

This absorption has the effect of seasoning or tempering said Portland cement so it acquires a desired stability and uniformity with enhanced slow setting properties.

It has been found that the best results are obtained with pure steam below 130° C. and above 100° C. or, for example, with a one to one mixture of steam and air below 110° C. and above 81.7° C. to give an absorption between 0.1 and 3%. It is generally desirable that the mixture contain not less than about 5% of steam.

The seasoning or tempering should preferably take place with the cement at a temperature as close to that of the moisture-containing atmosphere as possible.

To express the desired conditions in terms of the dew point it is generally desired to expose the cement to a steam-air or steam-gas mixture at an absolute centigrade temperature above 1.000 times the absolute temperature of the dew point and below 1.080 times the absolute temperature of the dew point. Specification of the dew point temperature of the steam-air or -gas mixture is equivalent to specifying the partial pressure or percentage of steam in the mixture since dew point and partial pressure are related. Having given the dew point temperature, one then knows the vapor pressure from vapor tension tables for water. The partial pressure of the steam is simply the ratio of the vapor pressure at the dew point to 760 mm. assuming that the steam-air or -gas mixture is at approximately atmospheric pressure as will usually be the case.

It has been found that the treatment may be very satisfactorily carried out by exposing the cement to the action of steam or steam-gas mixture in a rotating drum or finishing tube mill in which by way of a heating installation or an insulating structure and heat regulating device, a desired uniform temperature may be maintained.

To give preferred conditions which have been found to be very satisfactory in connection with the tempering of Portland cement, it has been found that if the cement is subjected to treatment with steam at a temperature lying between 100° C. and 130° C. (preferably about 112° C.) or with a steam-gas or air mixture at an absolute temperature between 1.000 and 1.080 times the absolute temperature of the dew point of the mixture (preferably about 1.032 times such absolute temperature) that a most satisfactory effect is obtained.

The seasoning or tempering of cement of ordinary present-day fineness (say about 85% to 95% through a 200 mesh sieve and having a surface area of about 1800 square centimeters per gram) appears to be an optimum when the absorption of water vapor is between 0.2% and 1.0%, the exact percentage of absorption varying with the particular character of cement. For example, a certain cement high in alumina required 0.8% while another low in alumina required 0.4% for optimum activation. For cements of greater fineness the optimum degree of absorption will be increased in proportion and may be as high as 3.0%, say for cement having such a fineness of sub-division as to have a surface area of about 6,000 square centimeters per gram.

Thus the optimum degree of absorption is a function of the degree of fineness and generally nearly the same for different cements. Expressed in terms of fineness of surface rather than in terms of weight, it has been found by experiment that the optimum degree of absorption is secured when the absorption is equal to or less than about 0.5% by weight per 1,000 square centimeters of cement surface or between 0.05% and 0.5%. The surface area per gram of cement may be measured by any suitable quantitative method, such as by the air analyzer described by Roller in Proceedings Am. Soc. Testing Materials vol. 32, Part II, p. 607 (1932), or the turbidimeter described by Wagner in ibid 33, part II, 553 (1933).

The effect of the treatment of the present application is to cause a change in and slightly beneath the surface layers of the cement particles, whether they be calcium aluminate particles or calcium silicate particles, without substantially changing the interior of said particles. The advantageous results of the present invention therefore arise from a limited surface treatment of the individual cement particles.

It appears that at the proper temperature and under proper conditions of exposure the rate of absorption of the steam by the cement decreases rapidly in the initial period to a low value and the rate of absorption has slowed down very greatly after about 20 minutes, provided an effective contact has been obtained.

With pure steam a small absorption is usually obtained with a temperature of about 130° C. The optimum temperature of exposure, however, for a cement in which proper contact is maintained about 5 to 60 minutes is between 107° C. and 117° C. or an average of about 112° C.

The rate of absorption increases rather uniformly with decrease in temperature except that as temperatures in the neighborhood of the dew point are approached a more rapid increase in the degree of absorption takes place with decrease in temperature.

For an extremely short exposure, however, the temperature may be decreased to as low as 100° C. to 104° C., but at temperatures less than 107° C. and which closely approach the dew point there is a considerable risk of over-treatment or over-seasoning of the cement with resultant undesirable caking, increased water requirement for the production of normal consistency, and decreased strength. Therefore it is generally preferred to keep the temperature at not less than about 107° C.

As a scientific control, it has been found that ratios of the absolute temperature of the steam-air or steam-gas mixture to the dew point temperature are most satisfactorily utilized, and that these ratios are applicable even though there be a considerable variation in the percentage of steam. As a general rule the optimum absolute temperature of absorption for a cement in which proper contact has been maintained for about 5 to 60 minutes is 1.019 to 1.046 times the temperature of the dew point or an average of about 1.032.

Thus the dew point temperature of a mixture of one part steam and one part air is 81.7° C. and the absolute temperature is 354.7° C. Therefore the optimum absolute temperature for treatment is about 1.032 times this temperature or 366° C. on the absolute scale and 93° C. on the standard scale.

With a steam-air or steam-gas mixture some absorption usually takes place when the absolute temperature is at about 1.080 times the absolute temperature of the dew point, but it is generally preferable to use a lower ratio than this as above stated. At the other extreme with an extremely short exposure the absolute treatment temperature may be as low as 1.000 to 1.010 times the absolute temperature of the dew point, but at a ratio lower than 1.019 the risk of over-seasoning is great and it is generally preferred to keep the ratio at not less than about 1.019.

It appears that optimum results have a close connection with respect to relative absorption of water vapor by tricalcium silicate and tricalcium aluminate in the Portland cement.

Apparently, with the optimum seasoning the tricalcium silicate is activated by the absorbed water vapor while the tricalcium aluminate is relatively not activated, and this is most desirably obtained at the relatively small absorption above stated.

When calcium silicate in Portland cement and particularly the tricalcium silicate absorbs water vapor, as above stated, it is activated so as to hydrate more rapidly when subsequently mixed with liquid water and simultaneously also to hydrolyze more rapidly to liberate lime or calcium hydroxide in solution during the formation of cement mix. But this activation of the tricalcium silicate to increase its subsequent rate of hydration and hydrolysis will not substantially affect the setting properties of the silicate in the cement.

Calcium aluminate in Portland cement and particularly tricalcium aluminate is inherently quick setting with or without the absorption of water vapor, but the tricalcium silicate when activated, as above described, will liberate lime in solution at such a rate as to overcome and substantially retard these quick setting properties of the tricalcium aluminate so that the cement as a whole will be slow setting.

In this regard, the lime in solution appears catalytically to retard the quick setting properties of the tricalcium aluminate and possibly also other minor calcium aluminates present, since relatively very small quantities of the lime in solution seem to be most highly effective to attain this end.

The activated tricalcium silicate will liberate the lime at such a rapid rate that the solution in contact with the aluminate particles may super-saturate with the lime, which super-saturated lime solution will be most effective in retarding the quick setting characteristics of the aluminates.

On the other hand, the limited absorption will prevent such activation or change in the tricalcium aluminate or other aluminates as to cause it to hydrate at such an excessive rate when subsequently mixed with water that the cement mixture will be quick setting if not mixed with an excessive amount of water as compared to the amount usually necessary for normal consistency.

If the absorption is carried too far and beyond the ranges above set forth, the tricalcium aluminate will hydrate so rapidly as to render the entire cement mixture sufficiently quick setting with the usual amount of mixing water and so as to reduce the advantageous effect resulting from the liberation of the lime by the activated silicate.

Up to the point of maximum optimum absorption the amount of water necessary for normal consistency will decrease but beyond this point of absorption the aluminate becomes too highly activated and thus causes the cement to require increased quantities of water to obtain normal consistency.

By normal consistency is meant a penetration of 10 mm. in one-half minute by a Vicat rod. As an example of the relation involved, a standard cement may require 23% mixing water for consistency, whereas the properly steamed cement may require only 21%, but when the optimum absorption is exceeded, the requirement may be as high as 40%.

Under the optimum conditions above stated, the cement has most enhanced slow setting properties, is in its most stable state, and possesses characteristics favorable to strength, and this is the preferred seasoned state.

However, when the absorption becomes too great and is above the optimum limitation set forth, the tricalcium aluminate also becomes effectively activated with consequent overseasoning of the cement. The overseasoned cement generally is caked into numerous small aggregates and requires a considerable increase in the amount of water to achieve normal consistency in the water mix with the undesired development of a voluminous paste and the production of a cement of low strength.

It is most important that the cement be subjected to the action of steam, a steam and air mixture or a steam and gas mixture at the controlled temperatures, pressures, lengths of time and moisture concentrations, described herein, since if the reaction is not carefully controlled undesirable results as described above will be obtained and a Portland cement of the desired high stability and uniformity will not result from the treatment.

For example, practically no absorption will take place when the treating temperature is too high as, for example, at 135° C. in the presence of pure steam or at 115° C. in the presence of a one to one steam-air mixture, and with non-absorption as will result from treatment at these temperatures the cement will retain its quick set and will not have the advantageous properties of the preferred product of the present invention. On the other hand, as stated above, when the temperature, while above, is yet too close to the dew point temperature, the absorption of water vapor may be excessive and give rise to over-seasoning with an undesirable caking of the cement into small or large aggregates.

This excessive absorption at temperatures slightly above the dew point is furthermore particularly objectionable since while a resultant product is obtained which is slow setting, the product disadvantageously requires an abnormally large amount of water to bring it to normal consistency with resultant production of a voluminous paste. Such a mixture will produce a cement of low strength.

For example, a cement exposed to pure steam for 20 minutes at 105° C. required an increase of water for normal consistency of 25% with a simultaneous reduction in the tensile strength to the amount of 30% in the 1:3 cement-sand mortar.

With proper absorption conditions, as stated above, the requirement of water for normal consistency is a minimum, the set is slow even without adding gypsum and the cement is of relatively high stability and uniformity.

In the accompanying drawings is shown a diagrammatic sketch of one type of an installation which may be conveniently employed for carrying out the process of the present application. In the figure the rotating drum A which may be provided with insulation, if desired, is driven by pinion and gear S and is provided with bearings N. The drum receives the cement at its left hand end from the screw conveyor B and dumps it at its right-hand end through the outlet C. The hopper K receives the heated cement after kilning and grinding and the cement from this hopper is fed into the screw conveyor B.

Pure steam, a steam-air mixture or steam-gas mixture is fed into the inlet end of the drum and, if desired, through the screw conveyor B and an effective contact is assured by the lift or stirring devices or fins G, which tend to shower the cement through the atmosphere in the interior of the rotating drum A.

Air or gas may be fed in controlled amount to the chamber M, through pipe R and may be mixed therewith a measured amount of steam delivered through pipe J. As a check on the proportioning or on the presence of an atmosphere of pure steam, the relative steam content of the drum may be measured at intervals.

The excess steam may be removed through the pipe D and reconditioned or reproportioned for reuse in the rotating drum A. Where the insulation of the rotating drum A is not sufficient to maintain a desired uniform temperature in the drum, it has been found desirable to enclose the entire apparatus in an insulating casing L which may be supplied with heated gas, as indicated at P, and with suitable regulating devices to maintain a desired temperature. The drum A may take the form of a finishing tube mill, if desired, but this is not preferable because of the difficulty of suitable temperature control and also temperature control would have to be maintained for each of the several tube mills, whereas the independent drum A, as shown in the accompanying figure, may take the output of part or all of the tube mills.

The heat insulating chamber L in conjunction with suitable regulating devices not only assures the maintenance of a uniform desired temperature within the drum A, but also obviates the existence of cool spots in the drum due to local air drafts and so forth, since such air drafts or local decreases in temperature might cause a sufficient decrease in temperature within the drum to result in overseasoning of the cement.

This control may also be attained by providing heat insulation in and about the hopper K and the drum A or electrical coils or other devices may be incorporated in the drum A to maintain a desired temperature. The cement and steam entering the chamber may also be preheated to a predetermined temperature or both the cement and steam may be superheated above the optimum treating temperature and then permitted to suffer a decrease in temperature so that the preferred conditions will obtain within the rotating drum.

By the word "gas" as used in the present specification and claims is preferably included air and other gases which do not react disadvantageously with cement, excluding therefore gases of relatively high $CO_2$ content.

It is clear from the above discussion that the degree of water vapor absorption (and therefore with the properties of the cement) is controlled by careful control of the temperature of the cement and steam, during the exposure. This method of control contrasts with other methods, such as for example, by varying the ratio of steam to cement as in Bamber, U. S. Patent No. 743,218, lines 51 to 62. In the present application the control of temperature controls the water vapor absorption regardless of the ratio of steam to cement.

In the Edison U. S. Patent No. 944,481 where a mixture of air and steam was used rather than steam alone certain temperature limits were mentioned, but there was no disclosure of the ratio of air to steam. This is quite important since each such ratio requires its own characteristic temperature limits, and such limits are stated in the present application.

The temperature as here defined refers in general to the mean temperature of the drum or mill or similar installation, such mean temperature varying only slightly where preferred conditions prevail from extreme temperatures at widely separated points. Where highly non-uniform conditions exist, the mean temperature may fall out of the specified preferred range of temperature. Under such conditions the existence of a favorable effect will be due to the existence at one or more points of temperatures that lie within the preferred range. Therefore, the existence at any point of an installation of temperatures lying within the specified preferred range of temperature shall constitute a utilization of temperature conditions within the specified range, and shall so be considered.

Having thus described my invention what I claim as new and desire to secure by Letters Patent is:—

1. The process of treating cement with steam, which comprises providing the cement in heated condition and having a temperature of between 105° C. and 130° C., superheating the steam to a temperature of between 105° C. and 130° C. and treating the so heated cement with the steam, for a period of more than 5 minutes whereby an amount of moisture is absorbed to produce a slow setting cement.

2. The process of treating cement with steam, which comprises superheating the steam to a temperature between 100° C. and 105° C., and subjecting the cement having a temperature of between 100° C. and 105° C., to the action of the steam for a period of not more than 5 minutes, whereby a slow setting cement is obtained.

3. The process of treating cement with a mixture of steam and air or gas, which comprises heating the mixture to an absolute temperature which is from 1.01 to 1.08 times the absolute temperature of the dew point of said mixture, causing the cement to be treated to have a temperature within the temperature range of said steam, and treating the cement with said steam, for a period of more than 5 minutes whereby a slow setting cement is obtained.

4. The process of treating cement with a steam and air or gas mixture, which comprises heating the mixture to an absolute temperature, which is from 1.00 to 1.01 times the absolute temperature of the dew point of said mixture, causing the cement to be preheated to the temperature range of said air and steam mixture, and treating the so heated cement with said mixture for not more than 5 minutes, whereby a slow setting cement is obtained.

5. A process of treating cement with steam which comprises preheating the cement to a temperature between 100° C. and 130° C., bringing the so heated cement into contact with steam heated to a temperature between 100° C. and 130° C., whereby a desired absorption of water vapor is induced in the cement.

6. A process of treating cement with an atmosphere containing steam which comprises preheating the cement to an absolute temperature between 1.00 and 1.08 times the absolute temperature of the dew point of said atmosphere, bringing the cement into contact with said atmosphere heated to an absolute temperature of 1.00 to 1.08 times the absolute temperature of the dew point, whereby a desired absorption of water vapor is induced in the cement.

PAUL S. ROLLER.